(12) United States Patent
Takahashi

(10) Patent No.: US 12,136,742 B2
(45) Date of Patent: Nov. 5, 2024

(54) POWER SUPPLY DEVICE, AND ELECTRIC VEHICLE AND POWER STORAGE DEVICE USING SAME

(71) Applicant: SANYO Electric Co., Ltd., Osaka (JP)

(72) Inventor: Hiroyuki Takahashi, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 376 days.

(21) Appl. No.: 17/630,552

(22) PCT Filed: Jul. 20, 2020

(86) PCT No.: PCT/JP2020/028026
§ 371 (c)(1),
(2) Date: Jan. 27, 2022

(87) PCT Pub. No.: WO2021/024773
PCT Pub. Date: Feb. 11, 2021

(65) Prior Publication Data
US 2022/0255181 A1   Aug. 11, 2022

(30) Foreign Application Priority Data
Aug. 7, 2019  (JP) .................. 2019-145727

(51) Int. Cl.
*H01M 50/289* (2021.01)
*H01M 10/04* (2006.01)
(Continued)

(52) U.S. Cl.
CPC ..... *H01M 50/289* (2021.01); *H01M 10/0486* (2013.01); *H01M 50/249* (2021.01); *H01M 50/262* (2021.01); *H01M 2220/20* (2013.01)

(58) Field of Classification Search
None
See application file for complete search history.

(56) References Cited

U.S. PATENT DOCUMENTS

| 2009/0239136 A1 | 9/2009 | Nagamine et al. |
| 2014/0220391 A1 | 8/2014 | Fujii et al. |

(Continued)

FOREIGN PATENT DOCUMENTS

| CN | 107408646 A | 11/2017 |
| JP | 2008-277050 | 11/2008 |

(Continued)

OTHER PUBLICATIONS

International Search Report of PCT application No. PCT/JP2020/028026 dated Oct. 20, 2020.

(Continued)

Primary Examiner — Tracy M Dove
(74) Attorney, Agent, or Firm — WHDA, LLP

(57) ABSTRACT

Power supply device is power supply device to be fixed to power supply target equipment, the power supply device including: a plurality of battery cells each having a prismatic outer covering can; a pair of end plates that cover both side end faces of a battery stack in which the plurality of battery cells are stacked; a plurality of fastening members that are plates extending in a stacking direction of the plurality of battery cells and are arranged on opposed side faces of the battery stack to fasten end plates to each other; bracket for fixing the pair of end plates to power supply target equipment; guide mechanism that slides end plate in the stacking direction of the battery stack at at least one interface between end plate and bracket; and elastic body arranged at at least one interface between end plate and bracket.

10 Claims, 13 Drawing Sheets

(51) Int. Cl.
    *H01M 50/249* (2021.01)
    *H01M 50/262* (2021.01)

(56) References Cited

U.S. PATENT DOCUMENTS

| 2017/0358785 | A1 | 12/2017 | Hattori et al. |
| 2019/0334145 | A1 | 10/2019 | Omura et al. |
| 2021/0050572 | A1 | 2/2021 | Omura et al. |

FOREIGN PATENT DOCUMENTS

| JP | 2016-091991 A | 5/2016 |
| JP | 2017-041322 | 2/2017 |
| JP | 2018-073642 | 5/2018 |
| WO | 2013/031613 | 3/2013 |
| WO | 2018/012224 | 1/2018 |

OTHER PUBLICATIONS

English translation of Search Report dated Dec. 9, 2023, issued in counterpart CN Application No. 202080055160.X. (2 pages).

POWER SUPPLY DEVICE, AND ELECTRIC VEHICLE AND POWER STORAGE DEVICE USING SAME

CROSS-REFERENCE TO RELATED APPLICATIONS

This application is a U.S. national stage application of the PCT International Application No. PCT/JP2020/028026 filed on Jul. 20, 2020, which claims the benefit of foreign priority of Japanese patent application No. 2019-145727 filed on Aug. 7, 2019, the contents all of which are incorporated herein by reference.

TECHNICAL FIELD

The present invention relates to a power supply device, and an electric vehicle and a power storage device using the power supply device.

BACKGROUND ART

The power supply device is used as a power supply device for driving an electric vehicle, a power supply device for power storage, and the like. In such a power supply device, a plurality of chargeable and dischargeable battery cells are stacked. It is known that battery cells have outer covering cans expanded by charging and discharging. In general, as illustrated in a perspective view of FIG. 12, in power supply device 900, end plates 903 are arranged on both side end faces of a battery stack, and end plates 903 are fastened to each other with metal bind bars 904, the battery stack being obtained by alternately stacking battery cells 901 having prismatic outer covering cans and insulating spacers 902.

Further, as shown in FIG. 13, such a power supply device 900 is fixed to an electric vehicle or the like by bolting an end plate or bind bar 904 via bracket 960.

On the other hand, with a recent demand for higher capacity, the number of stacked battery cells configuring a battery stack tends to increase. In such a configuration, an amount of expansion of each battery cell is accumulated to increase an amount of elongation of the battery stack as a whole. As a result, there is a problem that a large load is applied to a fixing point of a bracket for fixing a power supply device to an electric vehicle or the like. For example, as compared with power supply device 900 having such a length as shown in the side view of FIG. 13, when the number of stacked battery cells is increased as in power supply device 700 shown in a side view of FIG. 14, amounts of expansion will be accumulated according to the number of stacked battery cells. As a result, a stress load applied to a fixing point of bracket 760 that fixes the power supply device becomes excessive, causing a concern about fatigue and deterioration.

Further, as an increase in a length of the battery stack is advanced, bind bar 704 subjected to an expansion force also becomes longer to increase an amount of elongation, so that the stress on the bracket further increases. For preparing bracket 760 or a bolt adapted to such elongation, a material of bracket 760 should be changed to an expensive type, and a plate thickness, a bolt diameter or the number of bolts should be increased, or the like, resulting in inviting problems of cost-up and weight increase.

CITATION LIST

Patent Literature

PTL 1: WO2018/012224

SUMMARY OF THE INVENTION

One of the objects of the present invention is to provide a power supply device configured to prevent a large load from being applied to a fixing structure that is fixed to an electric vehicle or the like even when a battery stack becomes long, and an electric vehicle and a power storage device using the power supply device.

A power supply device according to a certain aspect of the present invention is a power supply device to be fixed to a power supply target equipment, and includes: a plurality of battery cells each having a prismatic outer covering can; a pair of end plates that cover both side end faces of a battery stack in which the plurality of battery cells are stacked; a plurality of fastening members that are plates extending in a stacking direction of the plurality of battery cells and are arranged on opposed side faces of the battery stack to fasten the end plates to each other; a bracket for fixing the pair of end plates to the power supply target equipment; a guide mechanism that slides the end plate in the stacking direction of the battery stack at at least one interface between the end plate and the bracket; and an elastic body arranged at at least one interface between the end plate and the bracket.

With the above configuration, even when the battery stack is displaced due to expansion of the battery cell, the elastic body is enabled to stably hold the battery stack while allowing the end plate to move in the stacking direction by the guide mechanism. Therefore, even when the number of stacked battery cells increases to increase displacement, the power supply device can be stably held while avoiding a situation where an excessive load is applied to fixed portions of the end plate and the fastening member and allowing expansion and contraction, resulting in improving reliability.

DESCRIPTION OF EMBODIMENTS

Figure 1:
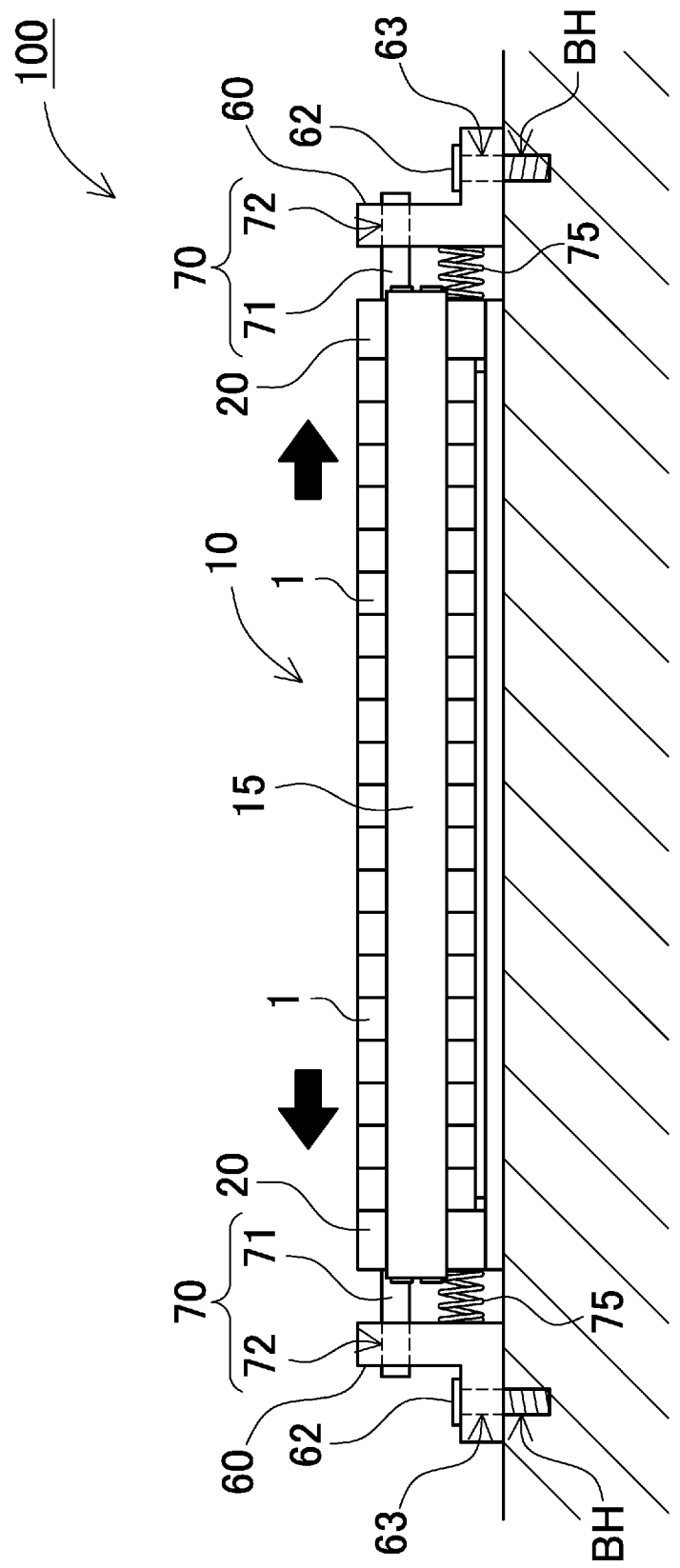
FIG. 1 is a schematic side view showing a state in which a power supply device according to a first exemplary embodiment is fixed to a power supply target equipment.

Exemplary embodiments of the present invention may be specified by the following configurations.

In a power supply device according to one exemplary embodiment of the present invention, the guide mechanism is configured with a guide shaft projecting from the end plate; and a guide tube opened in the bracket. With the above configuration, by sliding the guide shaft inserted into the guide tube, displacement at an interface between the bracket and the end plate can be smoothly performed.

In a power supply device according to another exemplary embodiment of the present invention, the guide tube includes a bush in which the guide shaft is slidably press-fitted. With the above configuration, the guide shaft is press-fitted into the bush to reduce rattling, so that stable sliding can be obtained.

Further, in a power supply device according to another exemplary embodiment of the present invention, the elastic body is a spring material.

Furthermore, in a power supply device according to a still another exemplary embodiment of the present invention, the guide mechanism and the elastic body are provided at each interface between the end plate and the bracket. With the above configuration, it is possible to stably hold the battery stack while absorbing expansion and contraction of the battery stack on both sides in a longitudinal direction of the power supply device.

Furthermore, in a power supply device according to a still another exemplary embodiment of the present invention, the center of the battery stack in the stacking direction is fixed to the power supply target equipment. With the above configuration, the displacement generated on both side end faces of the battery stack due to expansion and contraction of the battery cells can be absorbed by the guide mechanism and the elastic body while the center of the battery stack is fixed.

Furthermore, a power supply device according to a still another exemplary embodiment of the present invention further includes a bottom plate that covers a lower surface of the battery stack, in which the plurality of fastening members fasten the end plates to each other in a state where the battery stack is placed on an upper surface of the bottom plate.

Furthermore, a power supply device according to a still another exemplary embodiment of the present invention further includes a heat transfer sheet interposed between the upper surface of the bottom plate and the lower surface of the battery stack to bring the bottom plate and the battery stack into a heat-bonded state.

Furthermore, an electric vehicle according to a still another exemplary embodiment of the present invention includes: any one of the above-described power supply devices; a travel motor to which electric power is supplied from the power supply device; a vehicle main body on which the power supply device and the motor are mounted; and wheels that are driven by the motor to make the vehicle main body travel.

Furthermore, a power storage device according to a still another exemplary embodiment of the present invention includes: any one of the above-described power supply devices; and a power supply controller that controls charging to and discharging from the power supply device, in which the power supply controller enables charging to the battery cell with electric power from an outside and controls the battery cell to be charged.

First Exemplary Embodiment

Figure 2:
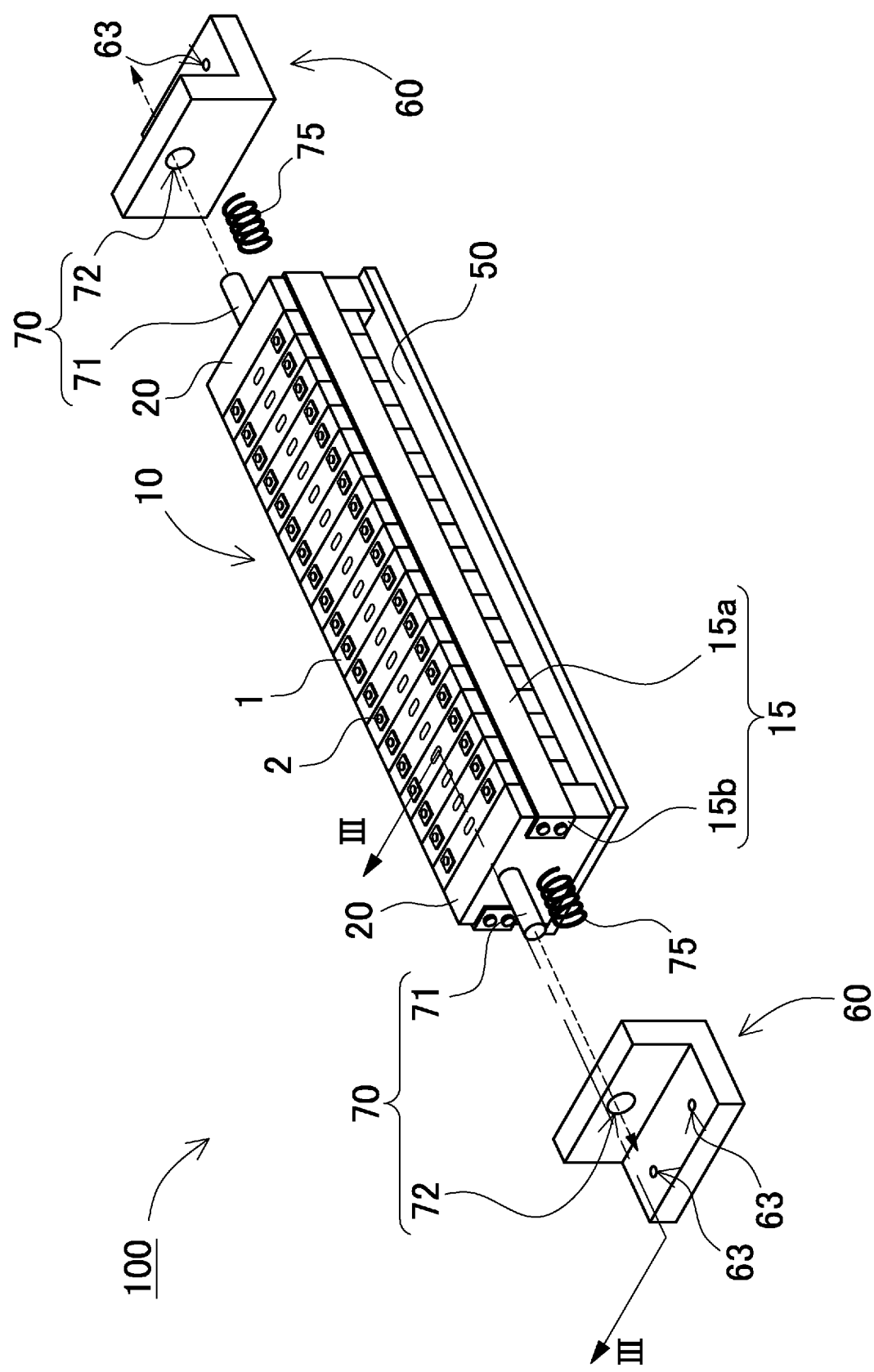
FIG. 2 is an exploded perspective view of the power supply device of FIG. 1.
Figure 3:
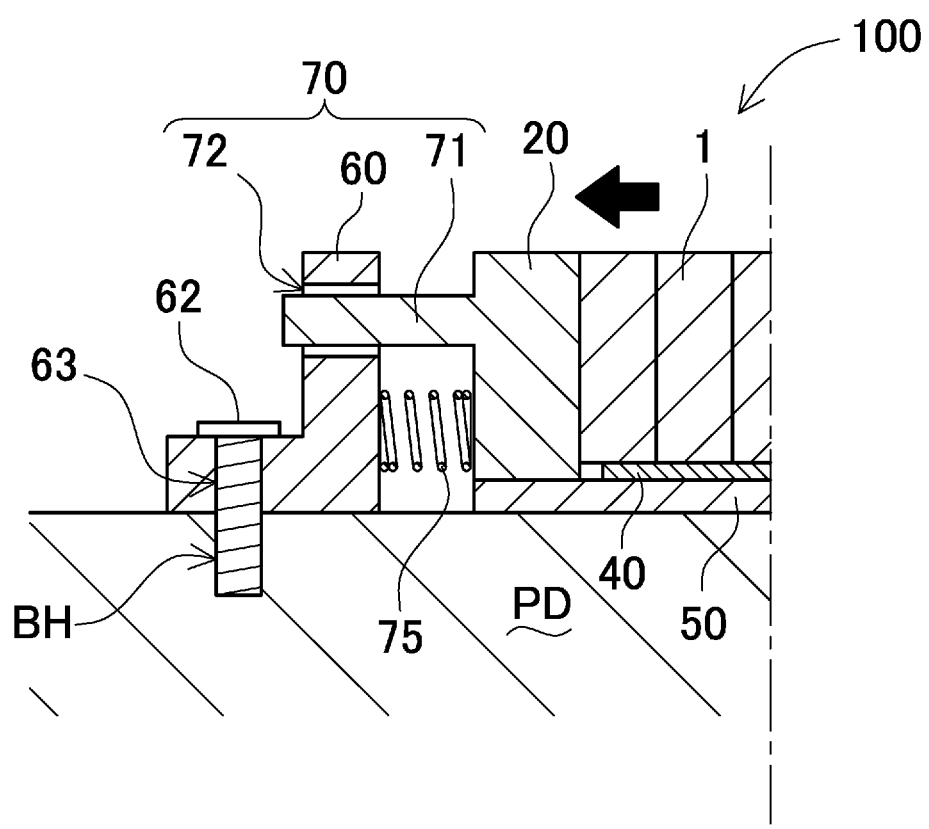
FIG. 3 is an enlarged sectional view of a main part of the power supply device of FIG. 2 taken along line
Figure 4:
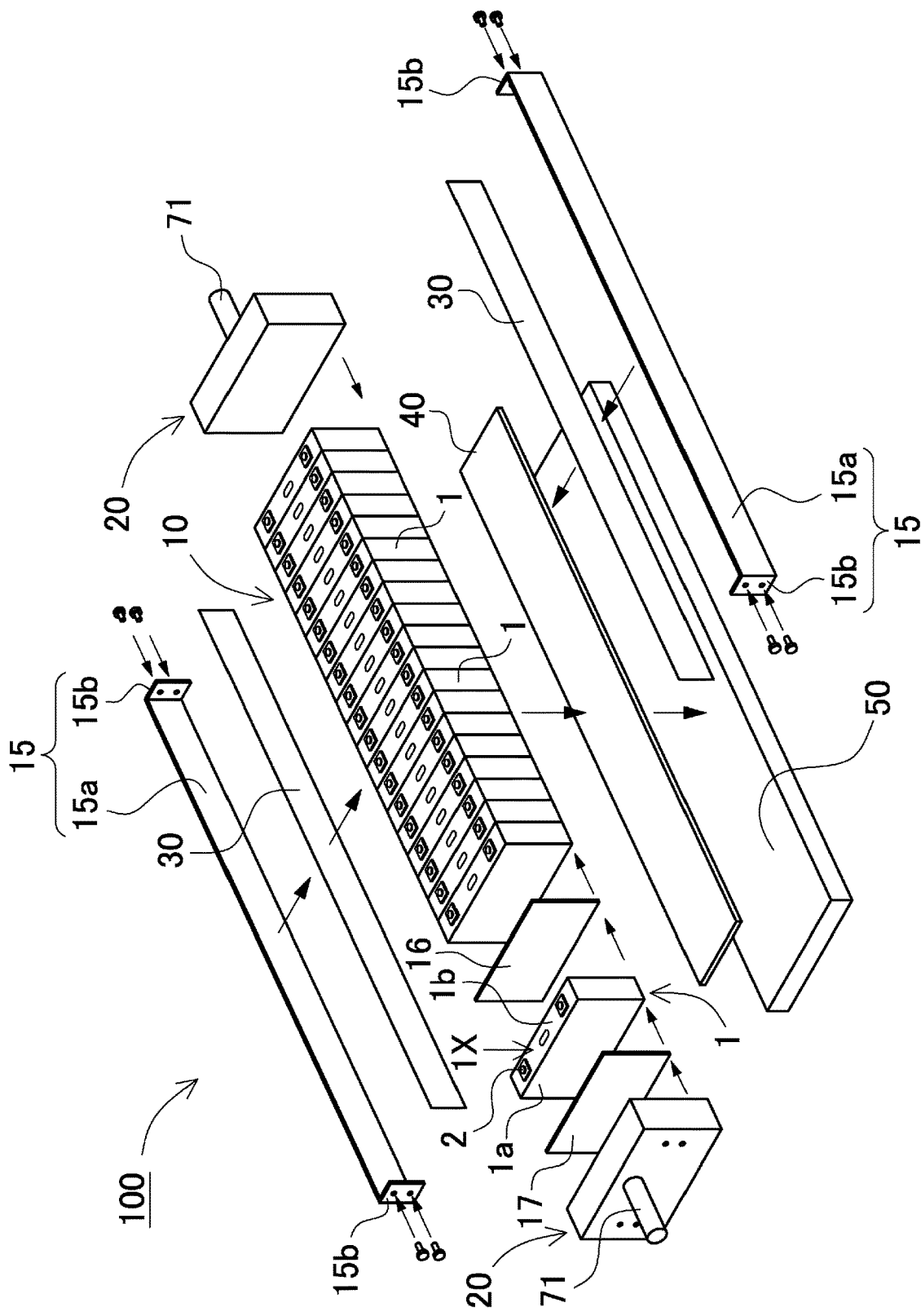
FIG. 4 is a further exploded perspective view of the power supply device of FIG. 2.

Power supply device 100 according to a first exemplary embodiment of the present invention is shown in FIG. 1 to FIG. 4. In these drawings, FIG. 1 is a schematic side view showing a state in which power supply device 100 according to the first exemplary embodiment is fixed to power supply target equipment PD, FIG. 2 is an exploded perspective view of power supply device 100 of FIG. 1, FIG. 3 is an enlarged sectional view of a main part of power supply device 100 in FIG. 2 taken along line and FIG. 4 is a further exploded perspective view of power supply device 100 of FIG. 2. Power supply device 100 shown in these drawings includes battery stack 10 in which a plurality of battery cells 1 are stacked, a pair of end plates 20 covering both side end faces of battery stack 10, a plurality of fastening members 15 for fastening end plates 20 to each other, and brackets 60 for fixing the pair of end plates 20 to power supply target equipment PD.

(Power Supply Target Equipment PD)

Power supply device 100 includes bracket 60 for fixing to power supply target equipment PD such as an electric vehicle. Bracket 60 is fixed to an end face of power supply device 100 in a longitudinal direction, that is, in a stacking direction of battery cells 1. In the example of FIG. 1, plate fixing bolt 62 or the like is screwed into and fixed to screw hole BH formed in the electric vehicle through bracket fixing hole 63 opened in bracket 60. As a result, both ends of power supply device 100 in the longitudinal direction are fixed to power supply target equipment PD.

(Bracket 60)

As shown in FIG. 1 to FIG. 3, bracket 60 is configured with a metal piece bent in an L shape. With bracket 60 fixed to each end plate 20, configuring a bottom surface of each bracket 60 and a bottom surface side of battery stack 10 to be substantially flush with each other as shown in the side view of FIG. 1 makes it easy to place and fix the power supply device on a flat surface of power supply target equipment PD. The shape of the bracket 60 is, however, one example, and any shape that enables fixing to the power supply target equipment can be used. For example, the bracket may be projected so as to protrude from a middle part of the end plate, so that the power supply device can be fixed so as to float. Further, the power supply device may be directly fixed to the power supply target equipment without using a bracket.

(Power Supply Device 100)

As shown in the exploded perspective view of FIG. 4, power supply device 100 includes battery stack 10 in which the plurality of battery cells 1 are stacked, the pair of end plates 20 covering both side end faces of battery stack 10, the plurality of fastening members 15 that fasten end plates 20 to each other, heat transfer sheet 40 having battery stack 10 arranged on a lower surface, and bottom plate 50 arranged on a lower surface of heat transfer sheet 40.

Fastening member 15 is formed in a plate shape extended in the stacking direction of the plurality of battery cells 1. The fastening members 15 are arranged on opposed side faces of battery stack 10, and fasten end plates 20 to each other with battery stack 10 placed on an upper surface of bottom plate 50.

Bottom plate 50 causes battery stack 10 placed on the upper surface of the bottom plate via heat transfer sheet 40 to dissipate heat. Further, heat transfer sheet 40 is interposed between the upper surface of bottom plate 50 and the lower surface of battery stack 10 to stabilize a heat-bonded state between bottom plate 50 and battery stack 10. As a result, even if battery stack 10 generates heat due to the charging and discharging of battery cell 1, the heat is conducted to bottom plate 50 via heat transfer sheet 40 to dissipate.

(Battery Stack 10)

As illustrated in the exploded perspective view of FIG. 4, battery stack 10 includes the plurality of battery cells 1 each having positive and negative electrode terminals 2, and bus bars (not shown) that are connected to electrode terminals 2 of the plurality of battery cells 1 to connect the plurality of battery cells 1 in parallel and in series. The plurality of battery cells 1 are connected in parallel and in series through the bus bars. Battery cell 1 is a chargeable and dischargeable secondary battery. In power supply device 100, the plurality of battery cells 1 are connected in parallel to form a parallel battery group, and the plurality of parallel battery groups are connected in series, resulting in connecting a large number of battery cells 1 in parallel and in series. In power supply device 100 illustrated in FIG. 4, the plurality of battery cells 1 are stacked to form battery stack 10. Further, the pair of end plates 20 are arranged on both end faces of battery stack 10. End portions of fastening members 15 are fixed to end plates 20 to fix stacked battery cells 1 in a pressed state.

(Battery Cell 1)

Battery cell 1 is a prismatic battery having a main surface as a wider surface with a prismatic outer shape and having a fixed cell thickness, the thickness being smaller than a width. Battery cell 1 is a secondary battery that can be charged and discharged, and is a lithium ion secondary battery. In the present invention, however, the battery cells are neither limited to prismatic batteries nor to lithium ion secondary batteries. As the battery cell, all rechargeable batteries such as a non-aqueous electrolyte secondary battery and a nickel hydrogen battery cell other than a lithium ion secondary battery can be also used.

In battery cell 1, an electrode body in which positive and negative electrode plates are stacked is housed in outer covering can 1a which is filled with an electrolyte and airtightly sealed. Exterior can 1a is molded into a prismatic tubular shape and is blocked at a bottom thereof, and has an upper opening airtightly blocked with sealing plate 1b made of a metal sheet. Exterior can 1a is produced by deep-drawing a metal sheet of aluminum, an aluminum alloy, or the like. Sealing plate 1b is produced using a metal sheet of aluminum, an aluminum alloy, or the like in the same manner as outer covering can 1a. Sealing plate 1b is inserted into the opening of outer covering can 1a, and by irradiating a boundary between an outer periphery of sealing plate 1b and an inner periphery of outer covering can 1a with a laser beam, sealing plate 1b is laser welded and airtightly fixed to outer covering can 1a.

(Electrode Terminal 2)

In battery cell 1, with sealing plate 1b which is a top face as terminal face 1X, positive and negative electrode terminals 2 are fixed to both end portions of terminal face 1X as illustrated in FIG. 4 or the like. Electrode terminal 2 has a projection formed to be cylindrical. However, the projection is not necessarily required to have a cylindrical shape but may have a polygonal or elliptic cylindrical shape.

Positions at which positive and negative electrode terminals 2 fixed to sealing plate 1b of battery cell 1 are set to be positions where the positive electrode and the negative electrode are arranged to be bilaterally symmetric. With such a configuration, battery cells 1 are stacked in a right and left reversed manner, and adjacent positive electrode and negative electrode close to each other of electrode terminal 2 are connected by bus bar, thereby enabling adjacent battery cells 1 to be connected in series as illustrated in FIG. 4 or the like. The present invention does not limit the number and a connection state of battery cells configuring the battery stack. The number and the connection state of the battery cells configuring the battery stack may be modified in various manners, inclusive of other exemplary embodiments to be described later.

The plurality of battery cells 1 are stacked such that a thickness of each battery cell 1 corresponds to the stacking direction to form battery stack 10. In battery stack 10, the plurality of battery cells 1 are stacked such that terminal faces 1X on which positive and negative electrode terminals 2 are provided, or sealing plates 1b in FIG. 4, are flush with each other.

In battery stack 10, insulating spacer 16 may be interposed between battery cells 1 stacked adjacently to each other. Insulating spacer 16 is made of an insulating material such as resin in the form of a thin plate or sheet. Insulating spacer 16 is formed to have a plate shape that is substantially equal in size to an opposed face of battery cell 1. Such insulating spacer 16 can be stacked between battery cells 1 adjacent to each other to insulate the adjacent battery cells 1 from each other. As a spacer arranged between adjacent battery cells, it is possible to use a spacer having a shape that allows a flow path through which a cooling gas flows to be formed between the battery cell and the spacer. It is also possible to cover a surface of battery cell 1 with an insulating material. For example, a surface of the outer covering can excluding the electrode portions of the battery cell may be thermally welded with a shrink tube or a shrink film of a polyethylene terephthalate (PET) resin or the like. In this case, the insulating spacer may be omitted. In a power supply device in which a plurality of battery cells have multi-parallel or multi-serial connection, while an insulating spacer may be interposed between the battery cells connected in series to each other to insulate them from each other, an insulating spacer between the battery cells connected in parallel to each other may be omitted because of no difference in voltage between adjacent outer covering cans.

In power supply device 100 illustrated in FIG. 4, end plates 20 are arranged on both end faces of battery stack 10. End face spacer 17 may also be interposed between end plate 20 and battery stack 10 to insulate them. End face spacer 17 can be also produced in the form of a thin plate or sheet with an insulating material such as resin or the like.

In power supply device 100 according to the first exemplary embodiment, in battery stack 10 in which the plurality of battery cells 1 are stacked on each other, electrode terminals 2 of the plurality of battery cells 1 adjacent to each other are connected by the bus bars to connect the plurality of battery cells 1 in parallel and in series. A bus bar holder may be arranged between battery stack 10 and the bus bars. Use of the bus bar holder allows the plurality of the bus bars to be arranged at fixed places on an upper surface of the battery stack while allowing the plurality of bus bars to be insulated from each other and allowing the terminal faces of the battery cells to be insulated from the bus bars.

The bus bar is produced by cutting and processing a metal sheet into a predetermined shape. For the metal sheet forming the bus bar, lightweight metal that has low electrical resistance, such as an aluminum sheet, a copper sheet, or an alloy of these metals can be used. However, for the metal sheet of the bus bar, other metal or an alloy of these metals having a low electrical resistance and being lightweight can be used as well.

(End Plate 20)

As shown in FIG. 4, end plates 20 are arranged at both ends of battery stack 10 and are fastened with each other through a pair of right and left fastening members 15 that are arranged along both side faces of battery stack 10. End plates 20 are arranged at both ends of battery stack 10 in the stacking direction of battery cells 1 and outside end face spacers 17 to sandwich battery stack 10 from both ends.

(Fastening Member 15)

Fastening member 15 has both ends thereof fixed to end plates 20 arranged on both end faces of battery stack 10. End plates 20 are fixed by the plurality of fastening members 15 to fasten battery stack 10 in the stacking direction. As shown in FIG. 4, fastening members 15 are each made of metal having a predetermined width and a predetermined thickness along the side face of battery stack 10, and are arranged so as to oppose both side faces of battery stack 10. A sheet of metal such as iron, preferably a steel sheet, can be used as fastening member 15. Fastening member 15 made of a metal sheet is bent into a predetermined shape by press-molding or the like.

As shown in the exploded perspective view of FIG. 4, fastening member 15 is provided with end plate locking pieces 15b bent in an L shape at end portions in a longitudinal direction of fastening main surface 15a, i.e., at both ends in a stacking direction of battery stack 10. End plate locking pieces 15b are screwed into end plates 20 to fix end plates 20 to each other.

As for the shape of fastening member 15 and the structure for fastening with end plate 20, known structures can be appropriately used. For example, both ends of the fastening member may be formed into a flat plate shape without bending into an L shape, and may be screwed with side faces of the end plate. Alternatively, with a part of the fastening member opposed to the side face of the end plate used as an engaging structure for engagement in a stepped manner, the fastening member being engaged with the side face of the end plate by the engaging structure may be further screwed.

Power supply device 100 having the numbers of battery cells 1 stacked is configured such that the plurality of battery cells 1 are bound by coupling end plates 20 arranged at both ends of battery stack 10 including the plurality of battery cells 1 by means of fastening members 15. By binding the plurality of battery cells 1 via end plates 20 and fastening members 15 that have high rigidity, it is possible to suppress malfunction or other faults caused by expansion, deformation, relative displacement, or vibration of battery cells 1 due to charging and discharging or degradation.

Figure 14:
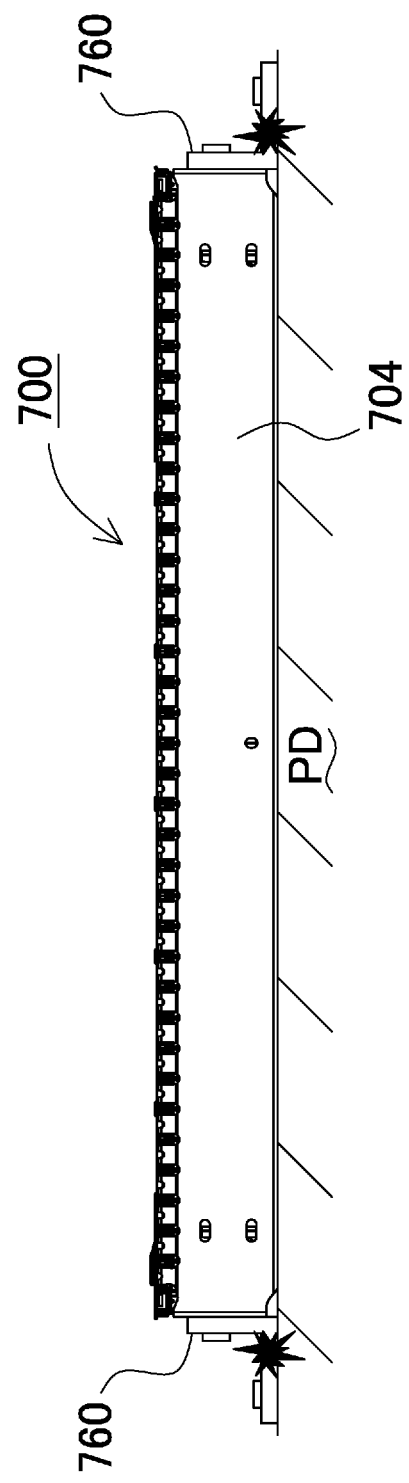
FIG. 14 is a side view showing a state in which a power supply device having an elongated battery stack is fixed to an electric vehicle or the like via a bracket.

In particular, in such long power supply device 700 having a large number of stacked battery cells as shown in FIG. 14, since an amount of displacement of the entire length of the battery stack due to expansion and contraction of the battery cells is large, a large load is applied to bracket 760 that fixes power supply device 700 to power supply target equipment PD. For example, when the number of battery cells increases from 12 cells to 36 cells, an amount of elongation becomes about 2.7 times, and a stress load increases proportionally thereto. The above-described power supply device having the guide mechanism and the elastic body is advantageous over such a long power supply device. Specifically, it is effective for a long power supply device having a rectangular aspect ratio of 5 or more in a plan view of the battery stack. For example, it is possible to avoid a situation in which a large load is applied to a fixing structure for fixing, to power supply target equipment PD, power supply device 100 having battery stack 10 with a long side of about 1 m to 1 m 20 cm and a short side of about 140 mm to 170 mm.

Insulating sheet 30 is interposed between fastening member 15 and battery stack 10. Insulating sheet 30 is made of a material having insulating properties, such as a resin, and insulates fastening member 15 and battery cells 1 made of metal.

The need of the insulating sheet can be eliminated in a case where the battery stack or a surface of the battery stack is insulated, for example, in a case where the battery cell is housed in an insulating case or covered with a heat-shrinkable tube or heat-shrinkable film made of resin, or in a case where a surface of the fastening member is applied insulating paint or coating, or in a case where the fastening member is made of an insulating material. Further, the insulating sheet may be configured to be used also as the above-described bus bar holder for holding the bus bar.

(Heat Transfer Sheet 40)

Heat transfer sheet 40 is made of a material having excellent thermal conductivity while having insulating properties. Further, heat transfer sheet 40, which has elasticity or flexibility, is pressed to be deformed between bottom plate 50 and battery stack 10, and adheres at the interfaces without a gap to bring about a heat-bonded state. As such heat transfer sheet 40, a silicone resin or the like can be preferably used. Further, a filler such as aluminum oxide may be added to increase thermal conductivity.

Further, it is preferable to provide a low frictional resistance region for reducing frictional resistance with battery stack 10 on an upper surface of heat transfer sheet 40. As such a low frictional resistance region, for example, a sliding sheet of another member may be arranged on the upper surface of heat transfer sheet 40. The sliding sheet should be made of a material with less frictional resistance than heat transfer sheet 40. As a result, when battery stack 10 is displaced on the upper surface of heat transfer sheet 40 due to expansion or contraction, the sliding sheet can be slid on the upper surface of heat transfer sheet 40 to avoid generation of wrinkles and maintain the heat-bonded state. As such a sliding sheet, for example, a polyethylene terephthalate (PET) film is preferable, and a biaxially stretched polyethylene terephthalate film is particularly suitable.

Further, a region for limiting frictional resistance may be provided on a surface of heat transfer sheet 40. For example, the frictional resistance is reduced by subjecting the surface of heat transfer sheet 40 to surface treatment or processing such as fluororesin coating. Alternatively, grease or oil may be applied to the surface of heat transfer sheet 40.

(Bottom Plate 50)

Bottom plate 50 covers the lower surface of battery stack 10. For bottom plate 50, a metal heat sink or the like having excellent thermal conductivity can be used. Further, bottom plate 50 may be internally provided with a cooling mechanism such as a refrigerant circulation path. This allows battery stack 10 to efficiently dissipate heat and to be cooled by refrigerant cooling, and allows heat transfer sheet 40 to suitably maintain the heat-bonded state between battery stack 10 and bottom plate 50.

(Guide Mechanism 70)

Further, power supply device 100 is provided with guide mechanism 70 so that even when battery stack 10 expands or contracts in the stacking direction due to expansion or contraction of battery cell 1, the displacement is absorbed to reduce a load on bracket 60. Guide mechanism 70 is provided at an interface between the end plate and bracket 60 as shown in the side view of FIG. 1 and the enlarged sectional view of FIG. 3.

Guide mechanism 70 can be a combination of, for example, guide shaft 71 and guide tube 72 into which guide shaft 71 is inserted. In the example of FIG. 2 and the like, guide shaft 71 is projected from the end plate, and guide tube 72 is opened, in the bracket 60, at a position opposed to guide shaft 71. As a result, sliding guide shaft 71 inserted into guide tube 72 enables displacement to be smoothly performed at the interface between bracket 60 and end plate 20.

Further, guide tube 72 may be a bush in which guide shaft 71 is slidably press-fitted. By forming the bush with a flexible member such as resin, rattling between an inner surface of guide tube 72 and an outer surface of guide shaft 71 is reduced to obtain smooth sliding. In addition, noise generation and wear of a sliding surface are reduced.

Although a length of guide tube 72 is equal to a thickness of bracket 60 in the example of FIG. 3, it may be longer than the thickness. For example, the guide tube may be projected to a back side (left side in FIG. 3) of the bracket. Such a configuration enables the guide tube to be stably held even when a stroke of the guide shaft is lengthened.

(Elastic Body 75)

Elastic body 75 is interposed at the interfaces between the end plate and bracket 60 to apply a repulsive force to these interfaces. In the configuration of FIG. 1, in particular, since bracket 60 is fixed to the power supply target equipment PD, elastic body 75 is in a state of urging end plate 20. As a result, even when battery stack 10 changes its overall length due to expansion or contraction, the battery stack is stably held without causing rattling between brackets 60.

As elastic body 75, a spring material can be preferably used. In the example shown in FIG. 2 or the like, a coil spring is interposed at the interface between bracket 60 and end plate 20. By fixing both ends of the coil spring to bracket 60 and end plate 20, respectively, the coil spring can be stably held at the interface between bracket 60 and end plate 20.

Although in the example of FIG. 3, the description has been made of a case where elastic body 75 is a coil spring, the present invention does not limit the shape of the elastic body to this, and other shapes can be appropriately adopted. For example, a leaf spring, a torsion spring, a rubber-like cylinder or a block shape such as a prism can be applied. In particular, a rubber-like elastic body has excellent insulating properties as compared with a metal spring, and is preferable from the viewpoint of safety.

Figure 5:
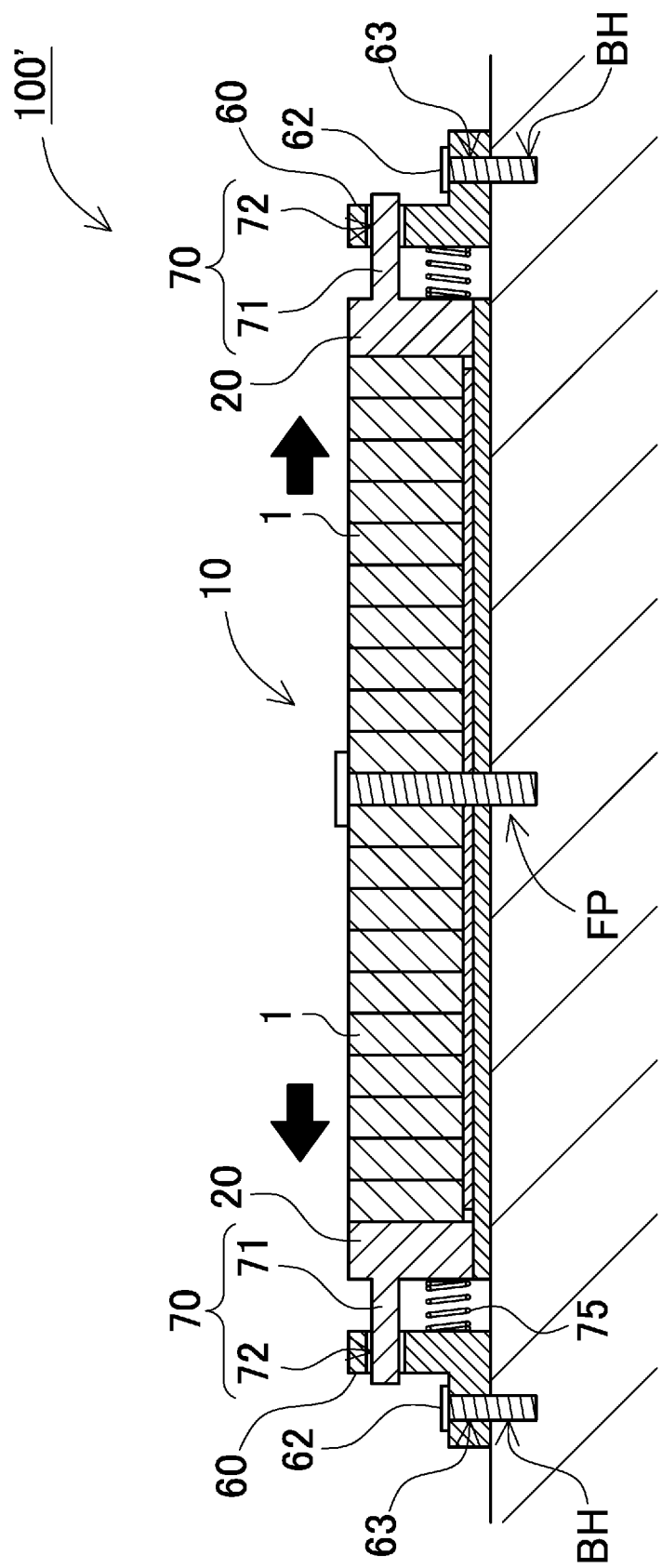
FIG. 5 is a sectional view showing a fixing position of the power supply device.

In the example of FIG. 2, battery stack 10 is maintained in a state of being urged by elastic body 75 between brackets 60 arranged on both sides of the battery stack. In other words, battery stack 10 itself is not fixed to power supply target equipment PD. On the other hand, battery stack 10 can be fixed to power supply target equipment PD. In particular, in order to stably fix the heavy battery stack 10 to power supply target equipment PD, it is advantageous to add a physical fixing structure between battery stack 10 and power supply target equipment PD. In order to fix battery stack 10 to power supply target equipment PD, for example, the bottom surface side of battery stack 10 can be directly attached to power supply target equipment PD or via a fixing member such as a jig. Further, fixing position FP is preferably set to the center of battery stack 10 in the stacking direction as shown in the side view of FIG. 5. In particular, considering that the total length of battery stack 10 changes in both directions (left and right in FIG. 5) of the stacking direction, by fixing the center of battery stack 10, expansion and contraction to the left and right can be absorbed by guide mechanism 70 and elastic body 75 provided at end plate 20 at each end face to stably fix the battery stack. The fixing position of battery stack 10 does not have to be the center in the longitudinal direction of power supply device 100' and need only be near the center. Further, in a case where simulation or the like assumes that battery stack 10 has a difference in an amount of expansion and contraction in left and right directions, the fixing position may be adjusted accordingly.

Although in the example of FIG. 2 or the like, the description has been made of a case where guide shaft 71 and guide tube 72 are provided at only one place at each interface between bracket 60 and end plate 20, the present invention is not limited to this configuration, and a plurality of combinations of the guide shaft and the guide tube may be provided at each interface between the bracket and the end plate. This obtains an advantage of increasing the strength and stability of sliding between the bracket and the end plate to allow highly reliable displacement while maintaining a parallel attitude. As an example of arrangement in which a plurality of guide shafts and guide tubes are provided, two sets of a guide shaft and a guide tube may be arranged side by side, and alternatively, a set of a guide shaft and a guide tube may be arranged at each of the four corners of the interface between the bracket and the end plate. Further, not only a set of the guide shaft and the guide tube but also a plurality of elastic bodies may be arranged at the interface between the bracket and the end plate.

Second Exemplary Embodiment

Figure 6:
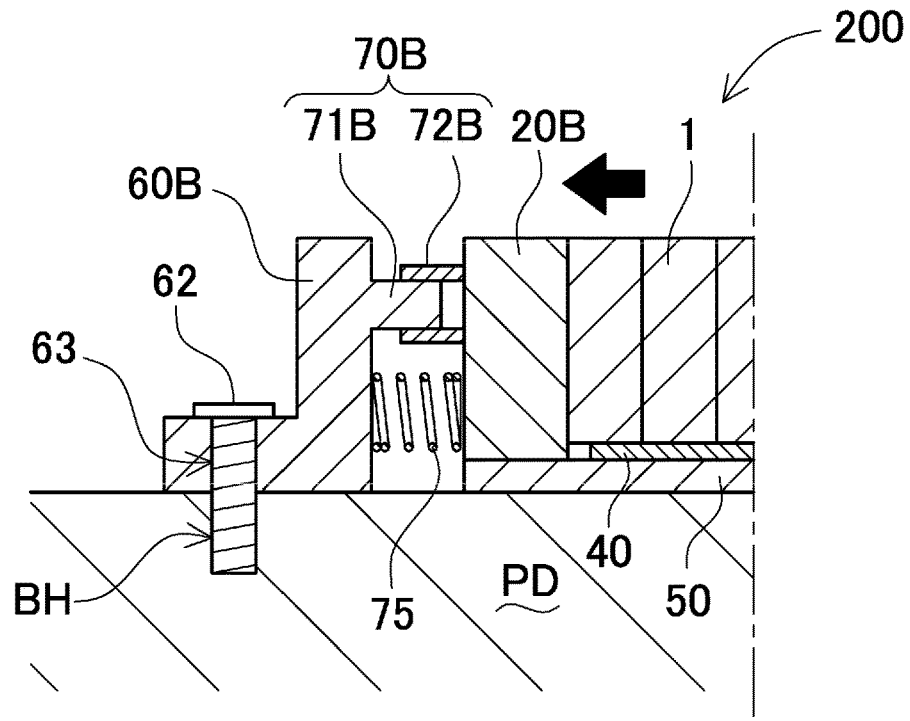
FIG. 6 is an enlarged side view of a main part of a power supply device according to a second exemplary embodiment.

Although in the example of FIG. 1, guide shaft 71 is provided on the end plate 20 side and guide tube 72 is provided on the bracket 60 side, the present invention is not limited to this configuration, and for example, the guide tube may be provided on the end plate side and the guide shaft may be provided on the bracket side. Such an example is illustrated as power supply device 200 according to a second exemplary embodiment in the enlarged sectional view of FIG. 6. In power supply device 200, end plate 20B includes guide tube 72B and bracket 60B includes guide shaft 71B. Even with such a configuration, while end plate 20B is linearly displaced by guide mechanism 70B, the displacement can be similarly absorbed by elastic body 75 so as not to be transmitted to bracket 60B.

Third Exemplary Embodiment

Figure 7:
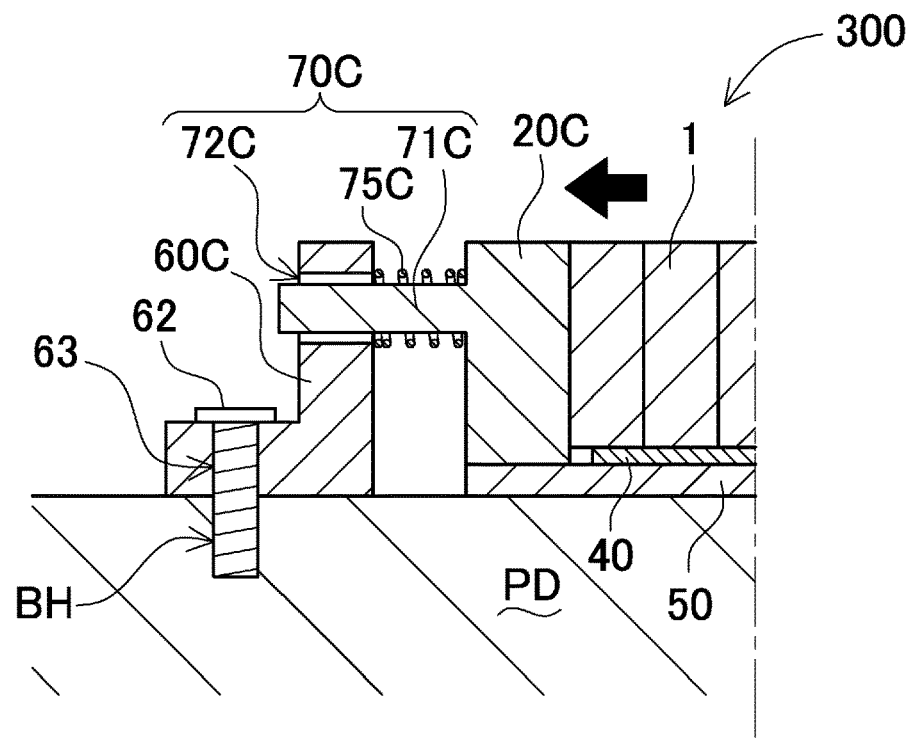
FIG. 7 is a side view of a power supply device according to a third exemplary embodiment.

Further, although in the above examples, the description has been made of a case where guide mechanism 70 and elastic body 75 are provided, as separate members, at the interface between end plate 20 and bracket 60, the present invention is not limited to this configuration, and the guide mechanism and the elastic body may be integrally configured. Such an example is illustrated as power supply device 300 according to a third exemplary embodiment in the enlarged sectional view of FIG. 7. In this power supply device 300, similarly to FIG. 3, guide shaft 71C is projected from the end plate 20C and inserted into guide tube 72C opened in bracket 60C. On the other hand, elastic body 75C is shaped like a coil spring, and a loop of the coil spring is made larger than an inner diameter of guide tube 72C. Furthermore, by arranging guide shaft 71C so as to pass through the loop of the coil spring, bracket 60C and end plate 20C are pressed around guide shaft 71C to urge an interface between bracket 60C and end plate 20C, thereby enabling end plate 20C to be held while allowing a change in a distance between bracket 60C and end plate 20C as shown in FIG. 7. With this configuration, an advantage can be obtained that guide mechanism 70C and elastic body 75C can be compactly arranged in a small space.

Fourth Exemplary Embodiment

Figure 8:
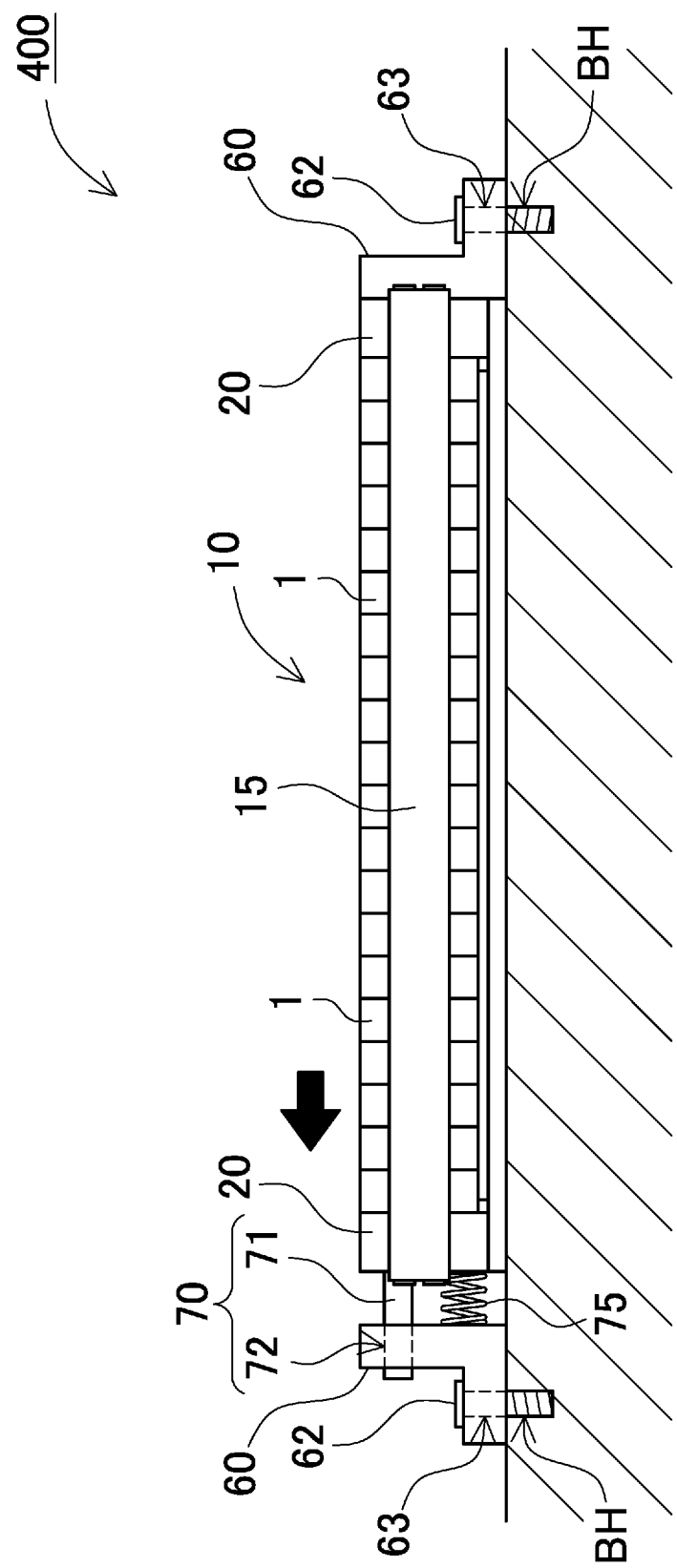
FIG. 8 is a side view of a power supply device according to a fourth exemplary embodiment.

Although in the above-described examples, the description has been made of a case where guide mechanism 70 and elastic body 75 are provided between each end plate 20 and each bracket 60, the present invention is not limited to this configuration, and the guide mechanism and the elastic body may be provided only at the interface between one end plate and one bracket. Such an example is illustrated as power supply device 400 according to a fourth exemplary embodiment in the side view of FIG. 8. In power supply device 400 shown in this drawing, guide mechanism 70 and elastic body 75 are arranged at the interface between end plate 20 and bracket 60 on the left side in the drawing but not at the interface between end plate 20 and bracket 60 on the right side. Even such a configuration is applicable as long as assumed displacement amount of battery stack 10 can be sufficiently absorbed by guide mechanism 70 and elastic body 75 on one side. In addition, an advantage of simplifying the configuration can be obtained by providing guide mechanism 70 and elastic body 75 on only one side.

Thus, even when battery stack 10 is displaced due to expansion of battery cell 1, elastic body 75 enables battery stack 10 to be stably maintained while guide mechanism 70 allows end plate 20 to move in the stacking direction. Therefore, even when the number of stacked battery cells 1 increases to increase displacement, the power supply device can be stably held while avoiding a situation where an excessive load is applied to fixed portions of end plate 20 and fastening member 15 and allowing expansion and contraction, resulting in improving reliability Power supply device 100 described above can be used as an automotive power source that supplies electric power to a motor used to cause an electric vehicle to travel. As an electric vehicle on which power supply device 100 is mounted, an electric vehicle such as a hybrid car or a plug-in hybrid car that travels by both an engine and a motor, or an electric car that travels only by a motor can be used, and the power supply device is used as a power source for these vehicles. Note that description will be made of an example in which in order to obtain electric power for driving an electric vehicle, a large-capacity and high-output power supply device is configured by connecting a large number of the above-described power supply devices 100 in series or in parallel, and further adding a necessary control circuit.

(Power supply device for hybrid car)

Figure 9:
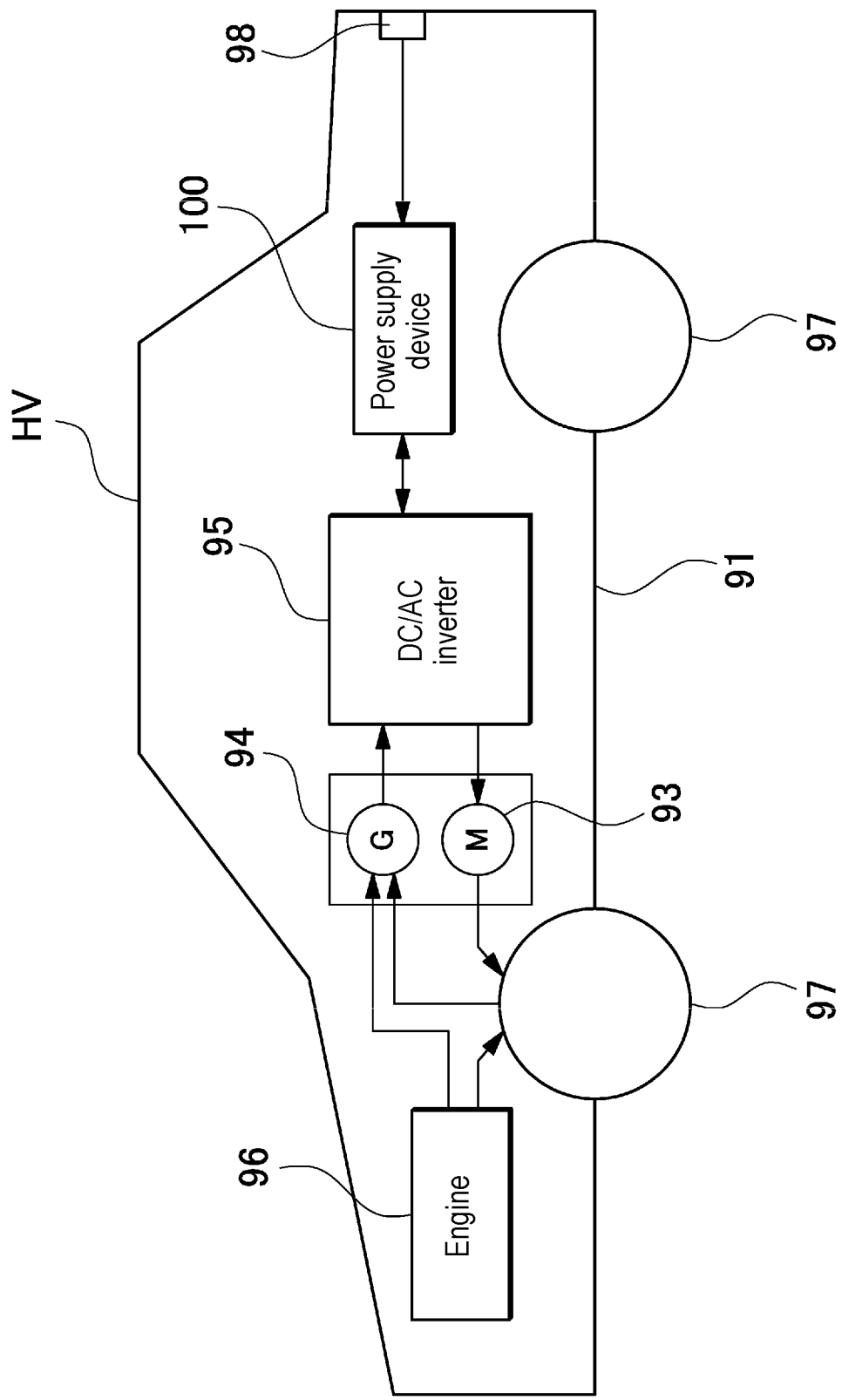
FIG. 9 is a block diagram illustrating an example in which a power supply device is mounted on a hybrid car that travels by an engine and a motor.

FIG. 9 illustrates an example in which power supply device 100 is mounted on a hybrid car that travels by both an engine and a motor. Vehicle HV on which power supply device 100 illustrated in this drawing is mounted includes vehicle main body 91, engine 96 and travel motor 93 that cause vehicle main body 91 to travel, wheels 97 that are driven by engine 96 and travel motor 93, power supply device 100 that supplies electric power to motor 93, and power generator 94 that charges a battery of power supply device 100. Power supply device 100 is connected to motor 93 and power generator 94 via DC/AC inverter 95. Vehicle HV travels by both motor 93 and engine 96 while charging and discharging the battery of power supply device 100. Motor 93 is driven to cause the vehicle to travel in a region of low engine efficiency, for example, during acceleration or low-speed traveling. Motor 93 is driven by electric power supplied from power supply device 100. Power generator 94 is driven by engine 96 or by regenerative braking generated at the time of applying braking to the vehicle, and charges the battery of power supply device 100. As illustrated in FIG. 9, vehicle HV may include charging plug 98 for charging power supply device 100. Connecting charging plug 98 to an external power source enables charging of power supply device 100.

(Power Supply Device for Electric Car)

Figure 10:
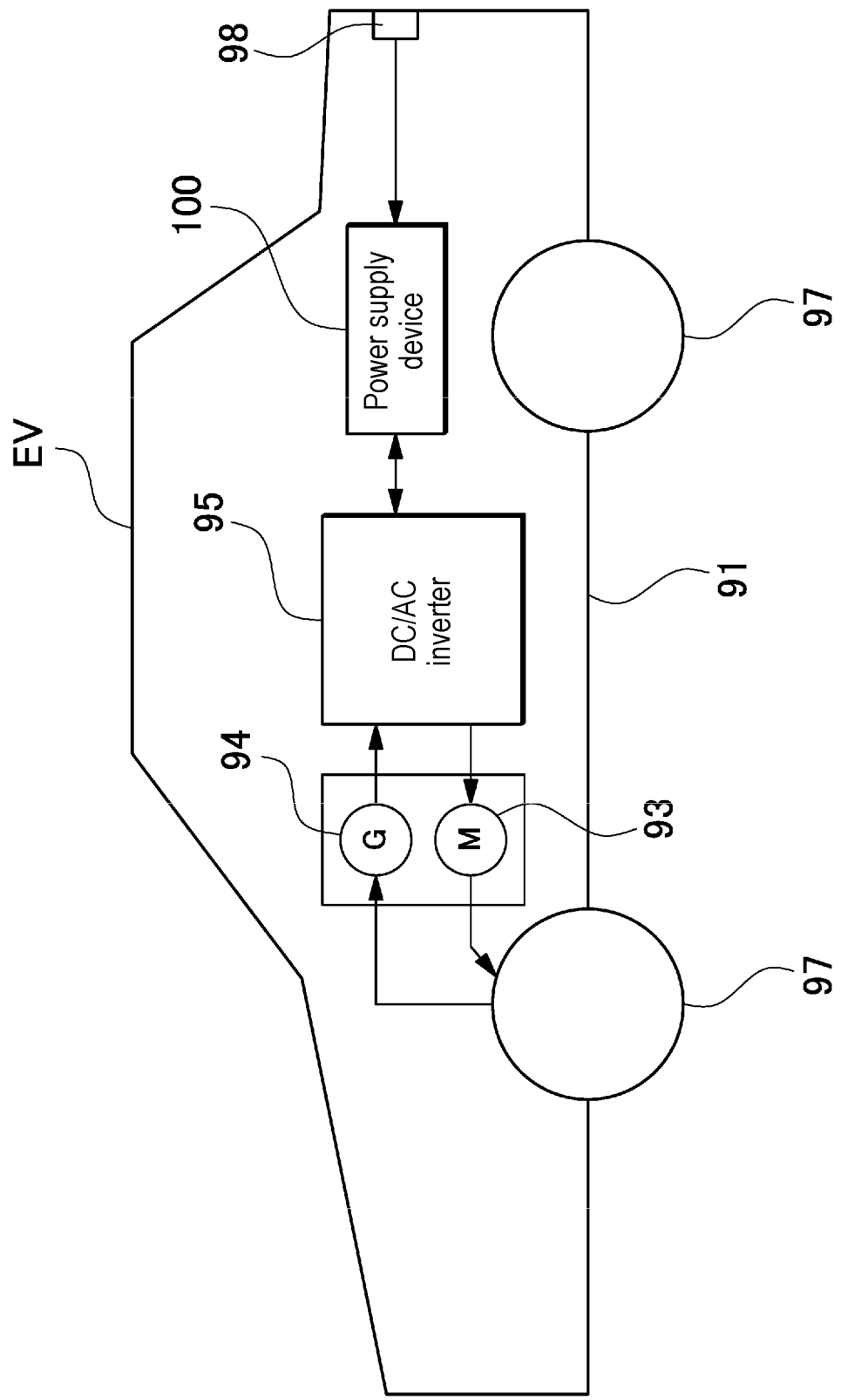
FIG. 10 is a block diagram illustrating an example in which a power supply device is mounted on an electric car that travels only by a motor.

FIG. 10 illustrates an example in which power supply device 100 is mounted on an electric car that travels only by a motor. Vehicle EV on which power supply device 100 illustrated in this drawing is mounted includes vehicle main body 91, travel motor 93 that causes vehicle main body 91 to travel, wheels 97 that are driven by motor 93, power supply device 100 that supplies electric power to motor 93, and power generator 94 that charges a battery of power supply device 100. Power supply device 100 is connected to motor 93 and power generator 94 via DC/AC inverter 95. Motor 93 is driven by electric power supplied from power supply device 100. Power generator 94 is driven by energy at the time of regenerative braking of vehicle EV to charge the battery of power supply device 100. Furthermore, vehicle EV includes charging plug 98, and connecting charging plug 98 to an external power source enables charging of power supply device 100.

(Power Supply Device for Power Storage Device)

Figure 11:
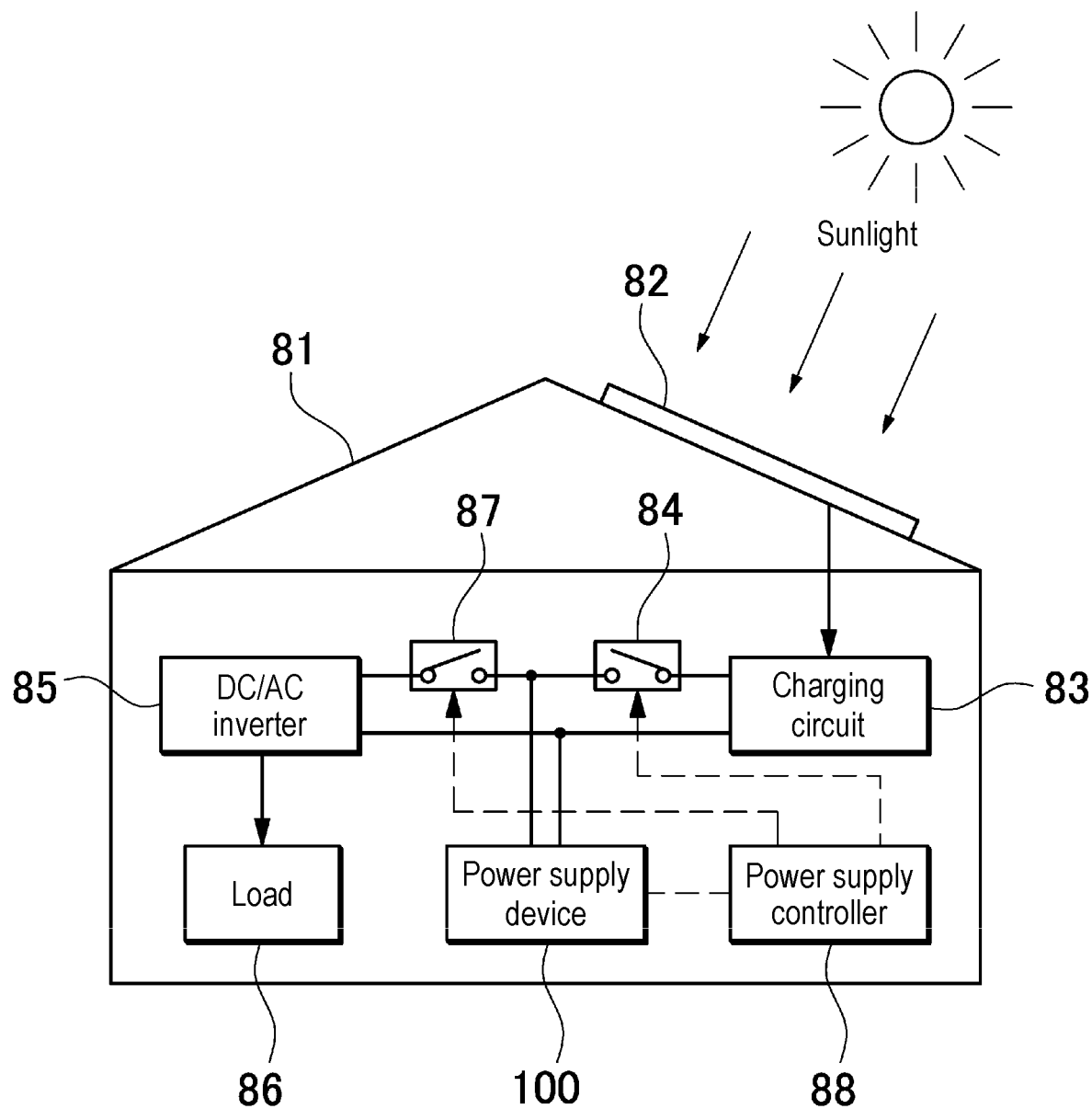
FIG. 11 is a block diagram illustrating an example of application to a power supply device for power storage.
Figure 12:
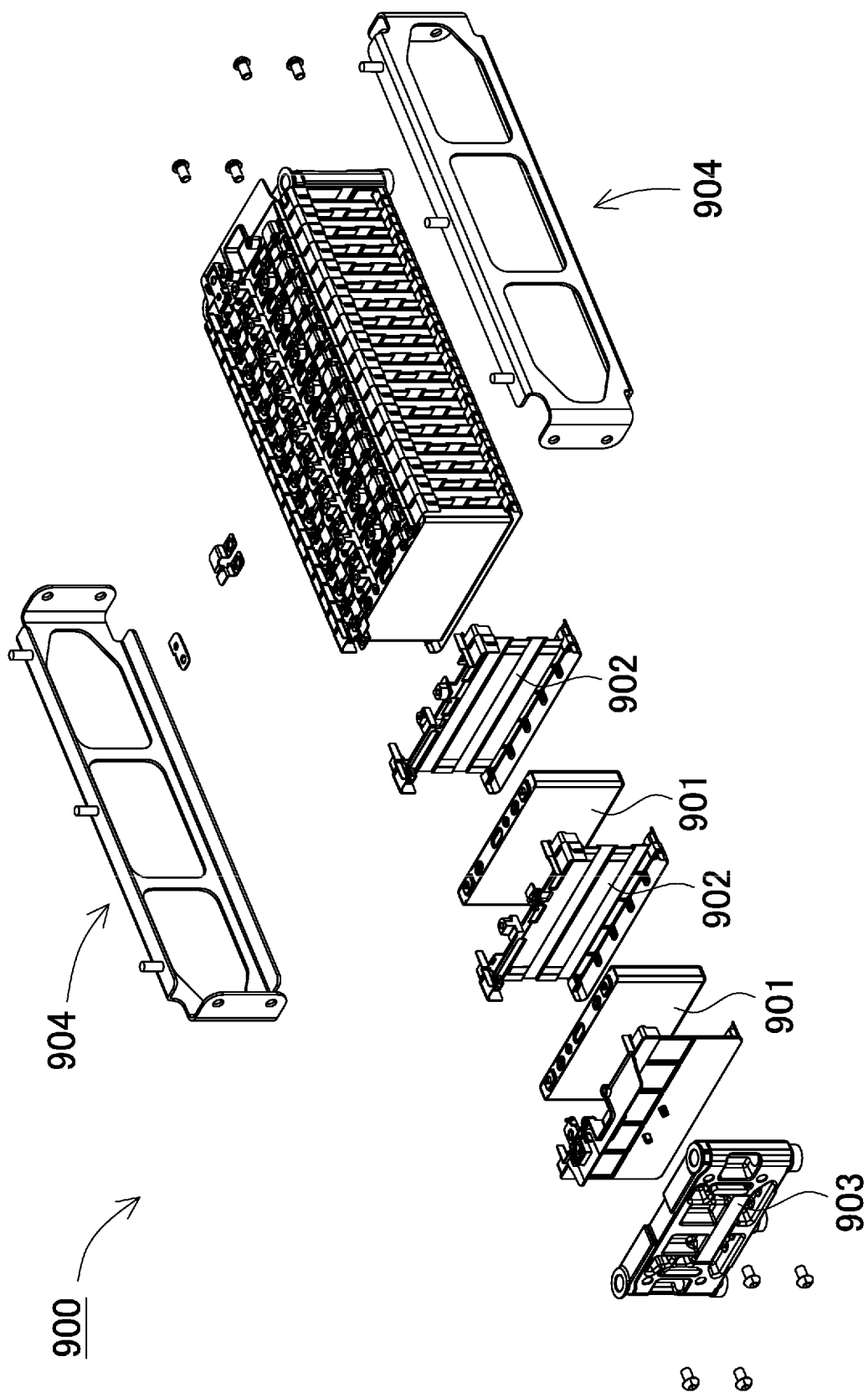
FIG. 12 is an exploded perspective view showing a conventional power supply device.
Figure 13:
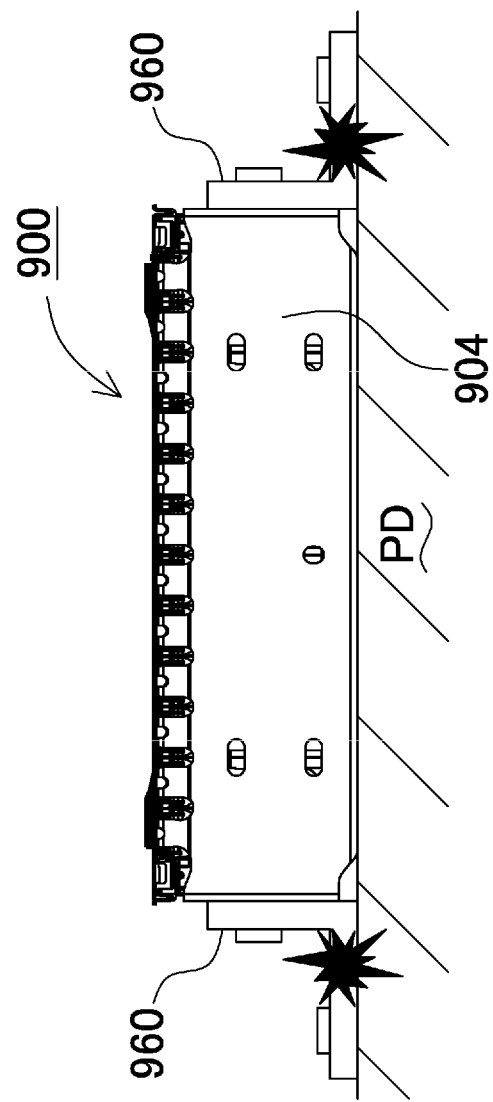
FIG. 13 is a side view showing a state in which a power supply device is fixed to an electric vehicle or the like via a bracket.

Further, the present invention does not limit an application of the power supply device to a power source for a motor that causes a vehicle to travel. The power supply device according to the exemplary embodiment can be used also as a power source for a power storage device that charges a battery with electric power generated by solar power generation, wind power generation, or the like, and stores electricity. FIG. 11 illustrates a power storage device that charges a battery of power supply device 100 with solar cell 82 and stores electricity.

The power storage device illustrated in FIG. 11 charges the battery of power supply device 100 with electric power generated by solar cell 82 arranged on a roof, a rooftop, or the like of building 81 such as a house or a factory. In this power storage device, the battery of power supply device 100 is charged by charging circuit 83 using solar cell 82 as a charging power source, and then electric power is supplied to load 86 via DC/AC inverter 85. Therefore, the power storage device has a charge mode and a discharge mode. In the power storage device illustrated in the drawing, DC/AC inverter 85 and charging circuit 83 are connected to power supply device 100 via discharging switch 87 and charging switch 84, respectively. On and off of discharging switch 87 and charging switch 84 are switched by power supply controller 88 of the power storage device. In the charge mode, power supply controller 88 switches charging switch 84 to on and switches discharging switch 87 to off to allow charging from charging circuit 83 to power supply device 100. Furthermore, when charging is completed and the battery is fully charged or in a state where a capacity equal to or larger than a predetermined value is charged, power supply controller 88 turns off charging switch 84 and turns on discharging switch 87 to switch the mode to the discharge mode, and allows discharging from power supply device 100 to load 86. Further, when needed, it is possible to turn on charging switch 84 and turn on discharging switch 87 to simultaneously conduct supply of electric power to load 86 and charging to power supply device 100.

Although not illustrated, the power supply device can be used also as a power source of a power storage device that charges a battery using midnight electric power at night and stores electricity. The power supply device charged with the midnight electric power can limit peak electric power during the daytime to a small value by being charged with the midnight electric power that is surplus electric power of a power plant, and outputting the electric power during the daytime when an electric power load increases. Further, the power supply device can be used also as a power source that is charged with both output of a solar cell and midnight electric power. This power supply device can efficiently store electricity in consideration of weather and power consumption by effectively utilizing both electric power generated by a solar cell and midnight electric power.

The power storage system as described above can be suitably used in applications including a backup power supply device that can be installed in a rack of a computer server, a backup power supply device for a wireless base station for a mobile phone or the like, a power storage device combined with a solar cell, such as a power source for power storage for domestic use or for use in a factory, a power source for a street light, or the like, and a backup power source for traffic lights, traffic indicators on roads or the like.

INDUSTRIAL APPLICABILITY

The power supply device according to the present invention and the vehicle equipped with the power supply device are suitably used as a large current power source used for a power source of a motor for driving an electric vehicle such as a hybrid car, a fuel cell car, an electric car, or an electric motorcycle. Among the examples are power supply devices for a plug-in hybrid electric car and a hybrid electric car that can be switched between an EV travel mode and an HEV travel mode, an electric car, and the like. Furthermore, the power supply device can be appropriately used also in applications including a backup power supply device that can be installed in a rack of a computer server, a backup power supply device for a wireless base station for a mobile phone or the like, a power storage device combined with a solar cell, such as a power source for power storage for domestic use or for use in a factory, a power source for a street light, or the like, and a backup power source for traffic lights or the like.

REFERENCE MARKS IN THE DRAWINGS

100, 100′, 200, 300, 400, 700, 900 power supply device
1 battery cell
1X terminal face
1a outer covering can
1b sealing plate
2 electrode terminal
10 battery stack
15 fastening member
15a fastening main surface
15b end plate locking piece
16 insulating spacer
17 end face spacer
20, 20B, 20C, 520, 620 end plate
30 insulating sheet
40 heat transfer sheet
50 bottom plate
60, 60B, 60C, 760 bracket
62 plate fixing bolt
63 bracket fixing hole
70, 70B, 70C guide mechanism
71, 71B, 71C guide shaft
72, 72B, 72C guide tube
75, 75C elastic body
81 building
82 solar cell
83 charging circuit
84 charging switch
85 DC/AC inverter
86 load
87 discharging switch
88 power supply controller
91 vehicle main body
93 motor
94 power generator
95 DC/AC inverter
96 engine
97 wheel
98 charging plug
901 battery cell
902 spacer
903 end plate
704, 904 bind bar
760, 960 bracket
PD power supply target equipment
BH screw hole
FP fixing position
HV, EV vehicle

The invention claimed is:

1. A power supply device to be fixed to a power supply target equipment, the power supply device comprising:
    a plurality of battery cells each including a prismatic outer covering can;
    a pair of end plates that cover both side end faces of a battery stack, the battery stack including the plurality of battery cells that are stacked;
    a plurality of fastening members that are plates extending in a stacking direction of the plurality of battery cells and are arranged on opposed side faces of the battery stack to fasten the end plates to each other;
    a plurality of brackets each fixing a corresponding one of the pair of end plates to the power supply target equipment;
    guide mechanisms each sliding a corresponding one of the end plates in the stacking direction of the battery stack at at least one interface between the corresponding one of the end plates and a bracket corresponding to the corresponding one of the end plates among the bracket; and
    elastic bodies each arranged at the at least one interface between a corresponding one of the end plates and a bracket corresponding to the corresponding one of the end plates among the brackets.

2. The power supply device according to claim 1, wherein each of the guide mechanisms is configured with:
    a guide shaft projecting from the corresponding one of the end plates; and
    a guide tube opened in the bracket.

3. The power supply device according to claim 2, wherein the guide tube includes a bush in which the guide shaft is slidably press-fitted.

4. The power supply device according to claim 1, wherein the elastic body is a spring material.

5. The power supply device according to claim 1, wherein the guide mechanism and the elastic body are provided at the at least one interface between the corresponding one of the end plates and the bracket corresponding to the corresponding one of the end plates among the brackets.

6. The power supply device according to claim 1, wherein a center of the battery stack in the stacking direction is fixed to the power supply target equipment.

7. The power supply device according to claim 1, further comprising:
a bottom plate that covers a lower surface of the battery stack,
wherein the plurality of fastening members fasten the end plates to each other in a state where the battery stack is placed on an upper surface of the bottom plate.

8. The power supply device according to claim 7, further comprising:
a heat transfer sheet interposed between the upper surface of the bottom plate and the lower surface of the battery stack to bring the bottom plate and the battery stack into a heat-bonded state.

9. A vehicle including the power supply device according to claim 1, the vehicle comprising:
the power supply device; a motor for travelling, supplied electric power from the power supply device; a vehicle main body on which the power supply device and the motor are mounted; and wheels that are driven by the motor to make the vehicle main body travel.

10. A power storage device including the power supply device according to claim 1, the power storage device comprising:
the power supply device; and
a power supply controller that controls charging to and discharging from the power supply device,
wherein the power supply controller enables charging to the battery cell with electric power from an outside and controls the battery cells to be charged.

* * * * *